United States Patent [19]
Strong

[11] Patent Number: 5,829,679
[45] Date of Patent: Nov. 3, 1998

[54] PLURAL COMPONENT AIRLESS SPRAY GUN WITH MECHANICAL PURGE

[75] Inventor: Christopher L. Strong, Boulder, Colo.

[73] Assignee: Binks Sames Corporation, Franklin Park, Ill.

[21] Appl. No.: 704,424

[22] Filed: Aug. 20, 1996

[51] Int. Cl.[6] .................................................. B05B 15/02
[52] U.S. Cl. ........................ 239/117; 239/414; 239/427; 92/52
[58] Field of Search ........................... 239/114–117, 398, 239/414, 427; 92/51, 52

[56] References Cited

U.S. PATENT DOCUMENTS

| | | | |
|---|---|---|---|
| 3,366,337 | 1/1968 | Brooks et al. | 239/414 |
| 4,133,483 | 1/1979 | Henderson | 239/118 |
| 4,377,256 | 3/1983 | Commette et al. | 239/117 |
| 4,471,887 | 9/1984 | Decker | 239/414 |
| 4,867,346 | 9/1989 | Faye et al. | 239/414 |
| 5,090,814 | 2/1992 | Petcen | 366/138 |
| 5,104,006 | 4/1992 | Brown | 239/414 |
| 5,299,740 | 4/1994 | Bert | 239/117 |

Primary Examiner—Andres Kashnikow
Assistant Examiner—Lisa Ann Douglas
Attorney, Agent, or Firm—Wallenstein & Wagner, Ltd.

[57] ABSTRACT

A plural component airless spray gun for reactive liquid materials has a mix chamber into which coreactive liquid components are introduced and mixed, an airless tip at a forward outlet from the chamber from which the mixed components are emitted in a fan-shaped spray, and a mechanically operated purge rod for cleaning residual reactants from the mix chamber and airless tip. The purge rod has a main body of a diameter slightly less than that of the mix chamber and a probe at its forward end that geometrically conforms to and is adapted to enter into and clean the inside of the spray tip. During spraying the purge rod is retracted in the mix chamber rearwardly of liquid reactant inlets to the chamber. Upon completion of spraying or periodically as desired, the purge rod is moved forwardly to clean the mix chamber and the inside of the airless tip of residual reactive components. To prevent damage to the airless tip should the probe of the purge rod encounter cured material within the tip or the tip itself as the purge rod is moved forward, the purge rod is moved forward by a piston assembly that is structured to decrease the forward driving force exerted on the purge rod when its probe is in the airless tip.

15 Claims, 2 Drawing Sheets

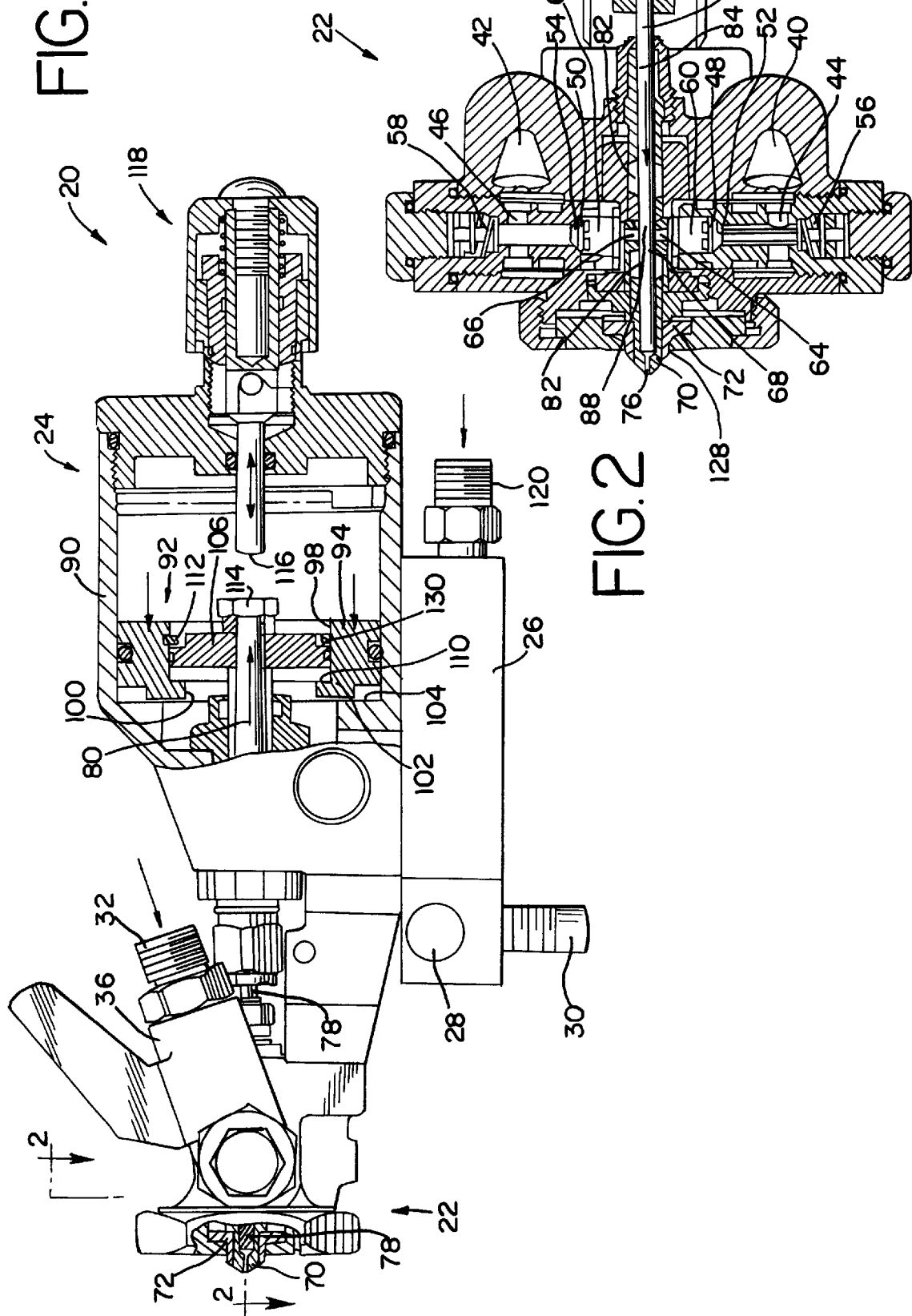

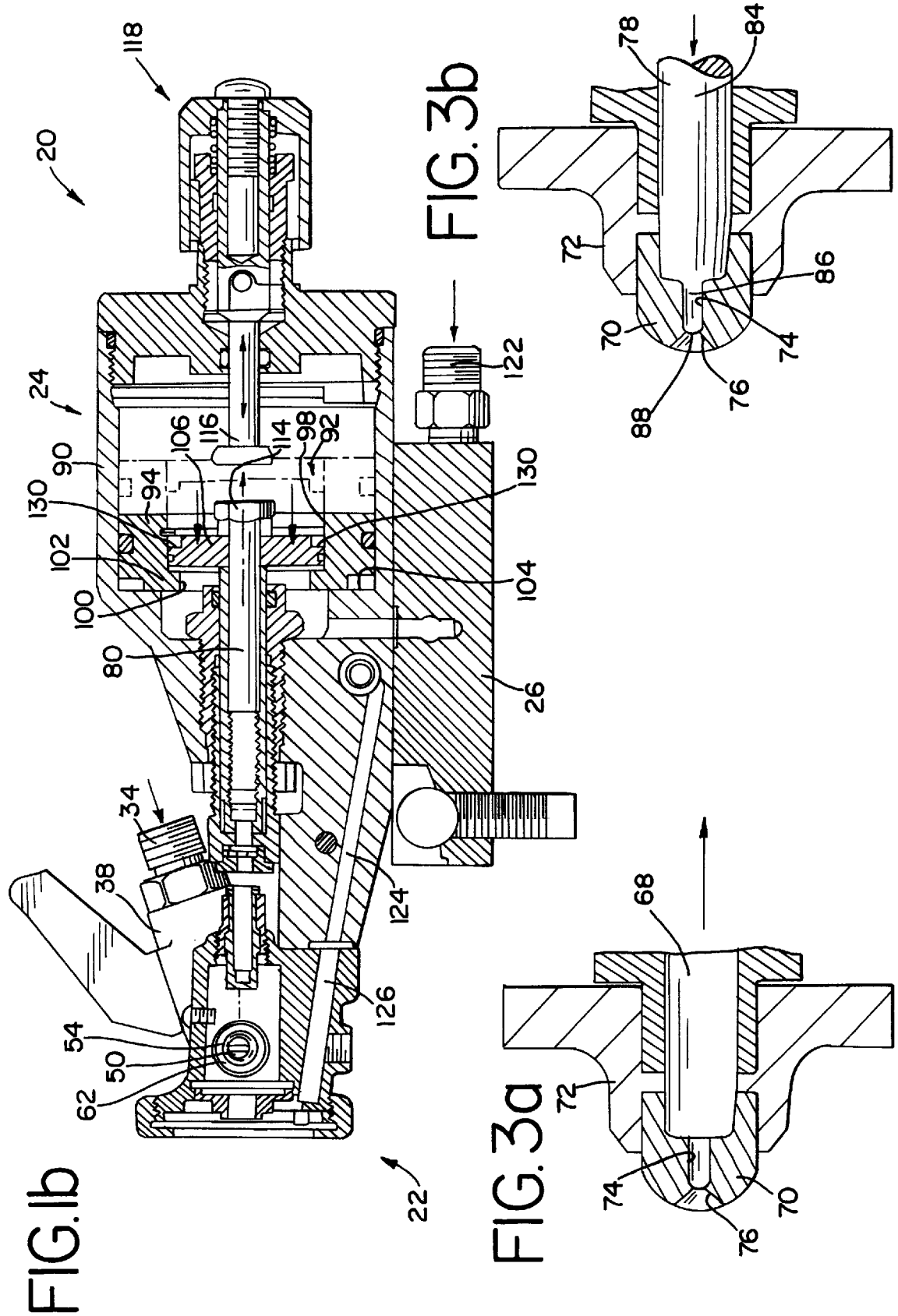

PLURAL COMPONENT AIRLESS SPRAY GUN WITH MECHANICAL PURGE

THE BACKGROUND OF THE INVENTION

The present invention relates to plural component airless spray guns, and in particular to a device for purging residual mixed components from a mix chamber and an airless tip of a plural component airless spray gun without causing damage to the airless tip.

The purging device of this invention finds use in plural component plastic application equipment of the general type described in U.S. Pat. No. 03,366,337, issued Jan. 30, 1968, wherein two coreactive streams of chemicals are intimately mixed within a gun and dispensed from an airless tip in a spray.

A problem that arises in prior art plural component guns is that, between operations, residual material remaining in a mix chamber and/or in an outlet nozzle tends to cure, making further mixing and dispensing impossible until the chamber and nozzle are purged of the hardened residue. In said U.S. Pat. No. 3,366,337, purging is accomplished by manually opening a valve to admit a flow of solvent and/or air through the mix chamber and nozzle to remove the residue. This purging procedure, however, has several disadvantages. First, the use of solvent adds unnecessary expense to the process. Also, the solvent is ejected under pressure and dispersed into the surrounding air, creating potential safety and environmental problems. Further, the blast of solvent and/or air, while forcefully ejecting hardened residue, scatters the residue haphazardly.

Other prior art contemplates utilizing a purge rod to eject excess material, such for example as in Henderson U.S. Pat. No. 4,133,483. The gun there described is for mixing and dispensing plural component plastic materials, and the rod that performs the purge process is normally positioned rearwardly of a mix chamber and of reactive liquid component inlet orifices to the chamber. The rod is selectively movable forwardly through the chamber to purge the chamber of residual material. The gun has a circular liquid outlet orifice from the mix chamber and does not utilize either pneumatics or hydraulics to atomize emitted materials, but instead mixed components "pour" out of the gun.

U.S. Pat. No. 5,299,740, issued Apr. 5, 1994 and assigned to the assignee of the present invention, and the teachings of which are specifically incorporated herein by reference, teaches a hand held plural component airless spray gun with a mechanical purge. The spray gun has a mix chamber into which reactive liquid components are introduced, and at an outlet from the mix chamber there is an airless spray tip from which the mixed liquid reactants are emitted in a hydraulically atomized spray. The mechanical purge of the spray gun comprises a purge rod that is configured and actuable to clean residual reactants from both the mix chamber and airless tip. During spraying, the purge rod is manually retracted rearwardly of the mix chamber and of coreactive liquid inlets to the chamber. Upon completion of spraying or periodically as desired, the purge rod is manually moved forwardly through the mix chamber until a probe at a forward end of the purge rod, which geometrically conforms to the inside of the airless tip, is extended into and through the airless tip, including through the airless tip orifice, to clean both the mix chamber and the airless tip and its orifice of residual reactive components. While the purge rod is extremely effective in cleaning the mix chamber and airless tip of residual reactive components, the airless tip is conventionally made of brittle carbide. Should there be cured material in the airless tip or should the probe of the purge rod contact the airless tip itself as it seats, the airless tip can be broken and destroyed.

OBJECTS OF THE INVENTION

An object of the present invention is to provide a plural component airless spray gun that can readily be purged of residual reactive materials.

Another object is to provide such a spray gun that is mechanically purged to clean both a reactive liquid component mix chamber in the gun and an airless spray tip at a forward outlet from the mix chamber.

A further object is to provide such a spray gun in which a purge rod is driven forwardly through the mix chamber and the airless tip to clean the same of reactive materials and wherein the driving force exerted on the purge rod is reduced when a probe at a forward end of the purge rod is within the airless tip to prevent the potential for damage to the airless tip by the probe.

SUMMARY OF THE INVENTION

In accordance with the present invention, a plural component airless spray gun has a mix chamber having inlet means and an outlet, and an airless tip at the mix chamber outlet that has passage means through it in communication with the mix chamber outlet. Means are provided for pressure delivery of liquid reactants through the mix chamber inlet means into and through the mix chamber, the mix chamber outlet and the airless tip passage means for emission from the passage means. To clean the mix chamber and the airless tip passage means of liquid reactants, the spray gun has a purge rod having a forward end and means for moving the purge rod forward end through the mix chamber past the mix chamber inlet means to and through the mix chamber outlet and then into and through the airless tip passage means to push liquid reactants out of the mix chamber and the airless tip passage means. To prevent damaging the airless tip should the forward end of the purge rod encounter cured reactants within the airless tip or the airless tip itself, the purge rod moving means exert a first forward driving force on the purge rod when its forward end is in the mix chamber and a second and reduced forward driving force on the purge rod when its forward end is in the airless tip passage means. The second driving force is less than sufficient to cause damage to the airless tip should the forward end of the purge rod encounter the airless tip or cured reactants in the airless tip.

The invention also contemplates a method of mechanically purging a plural component airless spray gun that has a mix chamber into which liquid reactants are pressure delivered for flow through the mix chamber and an outlet from the mix chamber into and through a passage through an airless tip for emission from the airless tip. The method comprises the steps of applying a driving force to a purge rod having a forward end to move the purge rod forward end into and through the mix chamber and then into and through the airless tip passage to push liquid reactants from the mix chamber and airless tip passage out of the airless tip passage. In addition, included is the step of controlling the driving force applied to the purge rod so that a first driving force is applied when the purge rod forward end is in the mix cylinder, and so that a second and reduced driving force is applied when the purge rod forward end is in the airless tip passage. The second driving force is controlled to be less than sufficient to cause damage to the airless tip should the forward end of the purge rod contact the airless tip or cured reactants in the airless tip when the purge rod is being moved forwardly.

The foregoing and other objects, advantages and features of the invention will become apparent upon a consideration of the following detailed description, when taken in conjunction with the accompanying drawings.

BRIEF DESCRIPTION OF THE DRAWINGS

FIG. 1a is a partly cross sectional side elevation view of a plural component airless spray gun that embodies the teachings of the invention;

FIG. 1b is a cross sectional side elevation view of the spray gun, in which some of the structure in a spray head of the gun has been omitted;

FIG. 2 is a cross sectional top plan view of the spray head of the gun, taken substantially along the lines 2—2 of FIG. 1a;

FIG. 3a is a cross sectional view of an airless tip and tip holder at an outlet from a mix chamber in the spray head of the gun, and FIG. 3b is a cross sectional view similar to FIG. 3a, except that a purge rod is shown extended through the mix chamber and airless tip.

DETAILED DESCRIPTION

The invention is embodied in a plural component airless spray gun having a purge rod for mechanically clearing a mix chamber and spray tip of the gun of residual liquid reactants to prevent the reactants from curing in and blocking the gun. A forward end of the purge rod comprises a probe that has a geometry that conforms or is complementary to the inside of the airless spray tip and is adapted to seat within the tip to purge the tip of residual reactants. During spraying of reactive liquids, the purge rod is retracted in the gun so that its forward probe is rearward of coreactive liquid inlets to the mix chamber. When the gun is triggered off, the purge rod is driven forwardly through the mix chamber and into the airless tip to clear the mix chamber and a passage through the airless tip of residual reactive material. The airless tip is often made of a brittle material such as carbide, and should the probe of the purge rod contact cured material in the airless tip or the airless tip itself, and if sufficient forward driving force is being applied to the purge rod, the airless tip can be broken.

The invention contemplates protecting the airless tip against such breakage by controlling the magnitude of the drive force imparted to the purge rod to move it forwardly through the mix chamber and into the airless tip. This is accomplished by initially driving the purge rod forwardly through the mix chamber with a first force, and by then reducing the drive force when the probe at the front of the purge rod is in the airless tip. The drive force is reduced by an amount sufficient that the airless tip will not be damaged should the purge rod probe encounter cured reactants in the airless tip or the airless tip itself.

Referring to the drawings, an internal mix plural component airless atomizing spray coating apparatus may take the form of an automatic airless spray gun, indicated generally at 20. The spray gun has at its forward end a spray head, indicated generally at 22. Behind the spray head is a motor means comprising an air cylinder and piston assembly, indicated generally at 24. The air cylinder and piston assembly is supported on a base 26 in which there is a passage 28 for receiving a rod (not shown) and a bolt 30 that may be tightened against the rod to attach the spray gun to the rod to support the spray gun during its operation. The spray head has a pair of liquid inlet fittings 32 and 34 for connection to respective supplies of coreactive liquid materials.

The liquid inlet fittings 32 and 34 are at inlets to respective manually operable ball valves 36 and 38. The ball valves mount on the spray head 22 and when the spray gun is in use are manually opened. Outlets 40 and 42 from the ball valves communicate with respective chambers 44 and 46 in associated one-way valves in the spray head. The one-way valves have respective valve stems 48 and 50 that normally are urged against respective seats 52 and 54 by springs 56 and 58. Upon pressure introduction of liquid reactants through the ball valves 36 and 38 into the chambers 44 and 46, the valve stems 48 and 50 are moved off of their seats 52 and 54 for flow of the liquid reactants into respective chambers 60 and 62.

A pair of impingement openings 64 and 66 in the spray head 22 communicate with the chambers 60 and 62, respectively, and open toward each other in diametric opposition into a rearward end of a mix chamber 68. The mix chamber extends longitudinally through the spray head and has an outlet at its forward end where it terminates at an airless tip 70 carried in a tip holder 72. The airless tip has a longitudinal passage 74 that extends forwardly from the mix chamber outlet to an elongate orifice 76 from the airless tip. Upon pressure introduction of liquid chemical reactants through the inlet fittings 32 and 34 at a pressure in the range of about 500 psi to 3000 psi, the reactants are delivered to and through the impingement openings 64 and 66. The reactants flow from the impingement openings in two streams of reactants that impinge against each other in the mix chamber, where they become thoroughly mixed and flow forwardly through the mix chamber into and through the airless tip longitudinal passage 74 to the airless tip elongate orifice 76 for emission from the orifice in a fan-shaped film of liquid that breaks up at its forward edge into a fan-shaped atomized spray.

To turn the spray gun 20 on and off and to mechanically clean the mix chamber 68 and the interior of the airless tip 70 of residual reactive material upon termination of spraying, the spray gun has a purge rod 78. The purge rod extends forwardly into the mix chamber from a forward end of a drive rod 80 that is reciprocated in longitudinal directions by the air cylinder and piston assembly 24. The purge rod has a cylindrical main body 84 of a first diameter that makes a close sliding fit with the mix chamber. The purge rod also has a cylindrical part 86, for cleaning the airless tip passage 74, that extends forwardly from the main body 84. The part 86 has a second diameter that is smaller than the diameter of the main body and slightly smaller than the diameter of the airless tip passage 74, and is adapted to enter the airless tip passage when the purge rod is driven forwardly. At the very forward end of the purge rod is an airless tip orifice cleaning part 88 that extends forwardly from the forward end of the part 86 and has a third diameter which is smaller than the diameter of the part 86 and slightly smaller than the dimension of the minor axis of the airless tip elongate orifice 76. The part 88 is adapted to extend through the airless tip orifice when the purge rod is fully extended forwardly. The purge rod parts 86 and 88 together comprise a probe at the forward end of the purge rod that is geometrically configured to conform to or to be complementary to the airless tip interior passage and orifice and that is adapted to move into and seat within the interior of the airless tip.

In operation of the spray gun 20, during spraying the purge rod 78 is retracted to uncover and open the impingement openings 64 and 66 and so that its forward end is rearward of the mix chamber 68 and of the impingement openings. This allows opposed streams of reactive liquid components to flow from the impingement openings and against each other in the mix chamber. The reactants become thoroughly mixed with each other within the mix chamber and flow forwardly through the mix chamber to and through the longitudinal airless tip passage 74 to the elongate airless tip orifice 76 for emission in an unstable fan-shaped liquid film that breaks up at its forward edge into a fan-shaped atomized spray. During spraying the reactants normally do not cure or set up hard within the mix chamber and airless tip. However, a boundary layer of the components can begin to form on the wall of the mix chamber. The boundary layer is relatively stagnant, and as the spraying operation continues the boundary layer can begin to cure and harden. Should a sufficiently long time lapse before the boundary layer is cleaned from the mix chamber, it can cure to a sufficiently hard state that it resists removal by the purge rod. It therefore is advantageous that the purge rod be used to clean the mix chamber and airless tip at sufficiently short intervals.

Accordingly, upon completion of spraying or periodically as necessary, the purge rod 78 is driven forwardly by the air cylinder and piston assembly 24, from its retracted position shown in FIGS. 2 and 3a to its extended position shown in FIGS. 1a and 3b. As the purge rod moves forwardly through the mix chamber 68, a shoulder defined between its first diameter main body 84 and its second and smaller diameter probe part 86 scrapes the boundary layer of coreactive components off of the mix chamber wall while the front of the purge rod pushes the reactants in the mix chamber forwardly to and through the airless tip passage 74 and orifice 76. The main body of the purge rod serves as a valve for the reactive materials, and as it moves forwardly past the impingement openings 64 and 66 it closes the openings to interrupt the flow of reactive liquid components into the mix chamber. When the purge rod probe moves into and through the airless tip passage 74, it pushes reactants from the passage to and out of the orifice 76, and with further forward movement of the purge rod its probe moves into the orifice to clear the orifice. Since the diameter of the probe part 88 is slightly less than the dimension of the minor axis of the orifice when it moves into the orifice the areas of the orifice to opposite sides of the probe part 88 and lying along the major axis of the orifice remain open to accommodate a continued outflow from the orifice of the reactive mixture as it is pushed from the airless tip by seating the purge rod probe within the airless tip. After the purge rod has been fully extended to complete the cleaning of the mix chamber and airless tip, it remains in its extended position until the gun is again triggered on, whereupon it is retracted to uncover and open the impingement openings 64 and 66.

To the extent described, the spray gun 20 with its purge rod 78 is similar to the plural component airless spray gun of said aforementioned U.S. Pat. No. 5,299,740. As in the spray gun of said patent, the forward end of the purge rod 78 has a geometry that conforms to the inside of the spray tip 70. When the gun is triggered off, the purge rod is driven forwardly to clear the mix chamber 68 and to seat its probe inside the airless tip. However, the airless tips are often made of carbide, and should the probe of the purge rod contact cured reactants in the airless tip or the airless tip itself as the probe is moved forward, the airless tip can be broken. This can happen as a result of the brittleness of the carbide tip in conjunction with the forward driving force exerted on the purge rod. If a sufficient forward driving force is imparted to the purge rod, the pressure that can be exerted by the probe on the airless tip or on cured material in the airless tip can and often will break and destroy the airless tip.

In improving upon the mechanical purge taught by said U.S. Pat. No. 5,299,740, according to the present invention the air cylinder and piston assembly 24 drives the purge rod 78 forwardly with a force that is controlled in accordance with the position of the purge rod. In particular, the forward driving force exerted on the purge rod is reduced when the forward end or probe of the purge rod is within the airless tip 70. In this manner, even if cured material within the airless tip or the airless tip itself is contacted by the purge rod probe, the forward driving force exerted on the purge rod by the air cylinder and piston assembly will not be sufficient to break and destroy the airless tip.

In the embodiment of invention disclosed, the air cylinder and piston assembly 24 comprises a cylinder 90 and a piston assembly, indicated generally at 92, slidably disposed within the cylinder. The piston assembly includes an annular outer piston 94 that is reciprocable in the cylinder 90 and has a passage extending axially through it. The passage has a rearward passage portion 98 of a first diameter and a forward passage portion 100 of a second and smaller diameter is defined within a radially inwardly extending annular rib 102 of the outer piston. A front side of the rib is adapted to engage a front wall 104 of the cylinder to limit forward movement of the outer piston in the cylinder.

The piston assembly 92 also includes an inner piston 106 slidably disposed within the rearward inner passage portion 98 of the outer piston 94 for reciprocation therewith. The inner piston also is reciprocable within and relative to the outer piston between a rearward shoulder 110 of the annular rib 102 and a ring 112 received in an annular groove in the passage portion 98.

The drive rod 80 connects at its rearward end to the inner piston 106 for reciprocation by and with the inner piston in longitudinal directions between a forwardmost position where the probe at the front end of the purge rod is received and seated within the passageway 74 and orifice 76 in the airless tip 70, and a rearwardmost position where a rearward end 114 of the drive rod abuts a stop 116 and the purge rod probe is rearwardly of both the mix chamber 68 and the impingement openings 64 and 66 to the mix chamber. A manually operable adjustment mechanism, indicated generally at 118, controls the longitudinal position of the stop 116 and thereby the rearwardmost longitudinal portion of the drive rod and purge rod.

To operate the cylinder and piston assembly 24, pressurized air is introduced to the cylinder 90 on one side or the other of the piston assembly 92 by coupling an air supply (not shown) to either an air inlet fitting 120 or an air inlet fitting 122 in the base 26. The air supply is also coupled to another fitting (not shown) in the base for delivery through air passages 124 and 126 to an air orifice 128 surrounding the airless tip 70 to blow residual reactants off of the outer surface of the airless tip.

With the spray gun off and the purge rod 78 piston assembly 92 in their forward or leftward positions, to turn the spray gun on, air is introduced to the cylinder 90 on the forward side of the piston assembly. This moves the piston assembly and thereby the drive rod 80 and purge rod rearwardly, usually with the shoulder 110 of the outer piston 94 then engaging the front surface of the inner piston 106 to assist the inner piston in moving the drive rod and purge rod rearwardly. As the purge rod is retracted rearward, its main body 84 and its forward probe move rearwardly of the mix chamber 68 and impingement openings 64 and 66, uncovering the impingement openings for introduction of liquid reactants into the mix chamber and emission from the airless tip 70 in an atomized spray. Retraction of the purge rod continues until the drive rod engages the stop 116.

Upon completion of a spraying operation, the spray gun 20 is triggered off. This is accomplished by introducing air to the cylinder 90 on the rearward side of the piston assembly 92, to move the outer and inner pistons 94 and 106 forwardly. Because the inner piston directly moves the drive rod 80 and purge rod 78 forwardly, it initially encounters greater resistance to forward movement than does the outer piston. This results in the outer piston initially moving forwardly faster than and relative to the inner piston, until the annular ring 112 carried by the outer piston engages an annular rearward facing shoulder 130 of the inner piston, whereupon the outer and inner pistons move forwardly conjointly with the outer piston pushing against and assisting the inner piston in applying a forward driving force to the drive rod and purge rod. The outer piston continues to assist the inner piston in driving the purge rod forwardly until the outer piston annular part 102 engages the cylinder wall 104, whereupon further forward movement of the outer piston is blocked and the inner piston then provides the sole driving force to continue to move the purge rod 78 forwardly. By this point, the gun is off because the purge rod has moved past and is blocking the impingement openings 64 and 66.

The relative axial or longitudinal dimensions of the various parts are such that upon forward movement of the outer piston 94 being blocked, the probe at the front of the purge rod 78 is positioned to enter or has just entered the passage 74 through the airless tip 70. At this time, because further forward movement of the outer piston has been blocked and the only force then driving the purge rod forwardly is that exerted on it by the inner piston 106, there is a reduced forward driving force tending to move the probe of the purge rod forwardly into and through the airless tip. This reduced driving force, which is dependent upon the rearward surface area of the inner piston and the pressure of air introduced to the cylinder 90, is controlled to be less than sufficient to break or otherwise damage the airless tip should the probe encounter an obstruction within the tip, such as cured reactants, or the airless tip itself. The inner piston continues its forward movement to drive the purge rod probe into and through the airless tip with the reduced driving force, until the probe is fully extended through and seated in the airless tip. The distance that the inner piston is free to move forwardly within the outer piston between the ring 112 and the shoulder 110 of the annular part 102 is sufficient to fully seat the probe of the purge rod in the airless tip.

The invention provides an improved apparatus for cleaning residual reactants from a plural component airless spray gun. By using a mechanical purge rod to clean a mix chamber and an airless tip of the gun, the gun can frequently and conveniently be purged without the use of solvent and before mixed reactants within it can cure to a point resisting removal. By virtue of the unique air cylinder and piston assembly that is used as a motor means for driving the purge rod forwardly through the mix chamber and airless tip of the gun, a first driving force is applied to the purge rod until its forward probe is about to enter or has just entered the airless tip, whereupon a second and lesser or reduced force is applied to the purge rod to move its probe through the airless tip. Because of the reduced driving force applied to the purge rod when its probe is moving through the airless tip, the potential for destroying the airless tip, should the probe encounter cured reactants in the airless tip or the airless tip itself, is greatly minimized if not eliminated. The result is a substantial increase in the life of the airless tip. It is understood, of course, that while the invention has been described in terms of an automatic spray gun, it also is applicable for use with a handheld spray gun.

While one embodiment of the invention has been described in detail, various modifications and other embodiments thereof may be devised by one skilled in the art without departing from the spirit and scope of the invention, as defined in the appended claims.

What is claimed is:

1. A plural component airless spray gun, comprising:

a mix chamber having inlet means and an outlet;

an airless tip at said mix chamber outlet, said airless tip having passage means therethrough in communication with said mix chamber outlet and terminating in an outlet orifice;

means for pressure delivery of liquid reactants through said mix chamber inlet means into and through said mix chamber, said mix chamber outlet and said airless tip passage means for emission from said outlet orifice;

a purge rod having a forward end; and means for moving said purge rod to move said purge rod forward end forwardly through said mix chamber past said mix chamber inlet means to and through said mix chamber outlet and into and through said airless tip passage means to push liquid reactants from said mix chamber and said airless tip passage means to and through said outlet orifice, said moving means exerting a first driving force on said purge rod to move the same when its forward end is in said mix chamber, and a second and reduced driving force on said purge rod when its forward end is in said airless tip passage means.

2. A plural component airless spray gun as in claim 1, wherein said purge rod forward end geometrically conforms to said airless tip passage means.

3. A plural component airless spray gun as in claim 1, wherein said purge rod has a main body rearwardly of its forward end, said main body geometrically conforms to said mix chamber and said forward end is geometrically conforms to said airless tip passage means.

4. A plural component airless spray gun as in claim 1, wherein said purge rod is configured so that upon being moved past said mix chamber inlet means it blocks said inlet means against further delivery of liquid reactants into said mix chamber.

5. A plural component airless spray gun as in claim 1, wherein said moving means moves said purge rod both forwardly into and through and rearwardly out of said mix chamber and said airless tip passage.

6. A plural component airless spray gun as in claim 1, wherein said moving means comprises a cylinder and piston assembly coupled to said purge rod for moving the same.

7. A plural component airless spray gun as in claim 6, wherein said piston assembly is reciprocable in said cylinder and comprises an outer piston reciprocable in said cylinder and having a passage extending axially therethrough and an inner piston reciprocable in said outer piston passage and coupled to said purge rod for reciprocating said purge rod, and means for introducing air under pressure to said cylinder on one side or the other of said piston assembly to reciprocate said piston assembly in said cylinder, said inner piston being constrained for limited reciprocative movement within and relative to said outer piston, said outer and inner pistons cooperating to exert said first driving force on said purge rod to move the same forwardly when its forward end is in said mix chamber, and only said inner piston moving said purge rod with said second and reduced force when its forward end is in said airless tip passage means.

8. A plural component airless spray gun, comprising:

a mix chamber having inlet means and an outlet;

an airless tip at said mix chamber outlet, said airless tip having passage means therethrough in communication with said mix chamber outlet and terminating in an outlet orifice;

means for pressure delivery of liquid reactants through said mix chamber inlet means into and through said mix chamber, said mix chamber outlet and said airless tip passage means for emission from said orifice;

a purge rod having a forward end; and motor means for reciprocating said purge rod within said mix chamber and said airless tip passage means and outlet orifice between a forward position where said purge rod extends through said mix chamber and said airless tip passage means and outlet orifice with said purge rod forward end in said airless tip passage means and outlet orifice, and a rearward position where said purge rod is retracted from said airless tip passage means and outlet orifice and said mix chamber, said motor means reciprocating said purge rod forwardly with a first driving force when said purge rod forward end is in said mix chamber and with a second and reduced driving force when said purge rod forward end is in said airless tip passage means, said purge rod when reciprocated forwardly pushing liquid reactants from said mix chamber and said airless tip passage means to and through said outlet orifice.

9. A plural component airless spray gun as in claim 8, wherein said purge rod has a main body rearwardly of its forward end, said purge rod forward end geometrically conforms to said airless tip passage means, and said purge rod main body geometrically conforms to said mix chamber.

10. A plural component airless spray gun as in claim 8, wherein said motor means comprises pneumatic motor means including a cylinder, a piston assembly in said cylinder coupled to said purge rod, and means for introducing pressurized air to said cylinder on one side or the other of said piston assembly to reciprocate said piston assembly in said cylinder and thereby reciprocate said purge rod, said piston assembly comprising an outer piston reciprocable in said cylinder and an inner piston reciprocable in an axial passage in said outer piston and coupled to said purge rod, said inner piston being constrained for limited reciprocative movement within and relative to said outer piston, said outer and inner pistons cooperating to conjointly move said purge rod forwardly with said first driving force when said purge rod forward end is in said mix chamber, said inner piston solely moving said purge rod forwardly with said second and reduced force when said purge rod forward end is in said airless tip passage means.

11. A plural component airless spray gun as in claim 10, including means for blocking forward movement of said outer piston when said purge rod forward end is in said airless tip passage means so that only said inner piston then exerts a forward driving force on said purge rod as said inner piston moves forward within and relative to said outer piston.

12. A plural component airless spray gun as in claim 11, wherein said limited reciprocative movement of said inner piston within said outer piston is sufficient to move said purge rod forward end fully into said airless tip passage means and outlet orifice.

13. A method of mechanically purging a plural component airless spray gun having a mix chamber into which liquid reactants are pressure delivered for flow through the mix chamber and an outlet from the mix chamber into and through a passage through an airless tip for emission from the airless tip, said method comprising the steps of:

applying a driving force to a purge rod having a forward end to move the purge rod forward end into and through the mix chamber and then into and through the airless tip passage to push liquid reactants from the mix chamber and airless tip passage out of the airless tip passage; and controlling the driving force applied to the purge rod so that a first driving force is applied to the purge rod when the purge rod forward end is in the mix cylinder and so that a second and reduced driving force is applied to the purge rod when the purge rod forward end is in the airless tip passage.

14. A method as in claim 13, wherein said controlling step controls the second driving force to be less than sufficient to cause damage to the airless tip by the purge rod should the forward end of the purge rod contact the airless tip or cured reactants in the airless tip.

15. A plural component airless spray gun, comprising:

a mix chamber into and through which liquid reactants are pressure delivered, said mix chamber having an inlet and an outlet;

an airless tip at said mix chamber outlet, said airless tip having at least one passage therethrough in communication with said mix chamber outlet and terminating in an outlet orifice;

a purge rod having a forward end; and a motor connected to said purge rod wherein said motor effects movement of said forward end of said purge rod forwardly through said mix chamber past said mix chamber inlet to and through said mix chamber outlet and into and through said airless tip passage, said motor exerting a first driving force on said purge rod to move the purge rod when its forward end is in said mix chamber, and a second and reduced driving force on said purge rod when its forward end is in said airless tip passage.

* * * * *